June 5, 1956 T. E. DINSMOOR 2,748,704
ARMING DEVICE FOR TORPEDO EXPLODERS
Filed Nov. 29, 1951 5 Sheets-Sheet 1

INVENTOR.
T. E. DINSMOOR
BY
ATTYS.

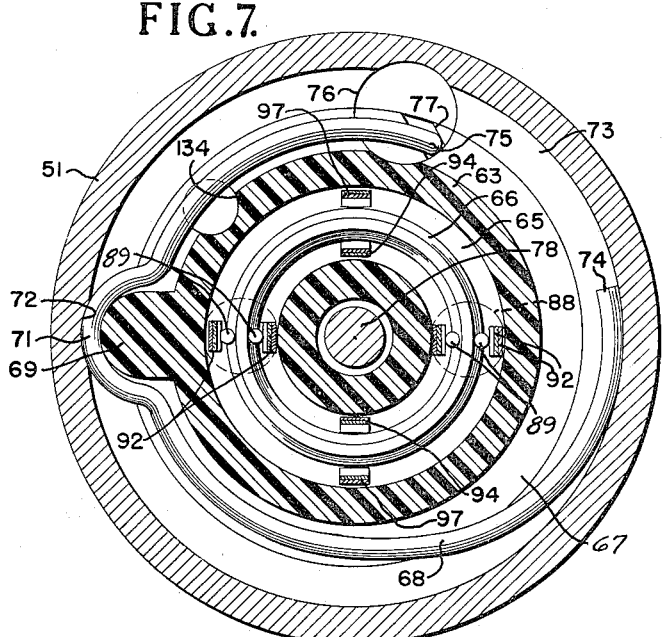
FIG.7.
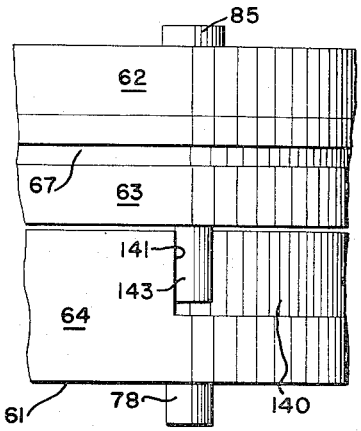
FIG.14.
FIG.8.
FIG.15.
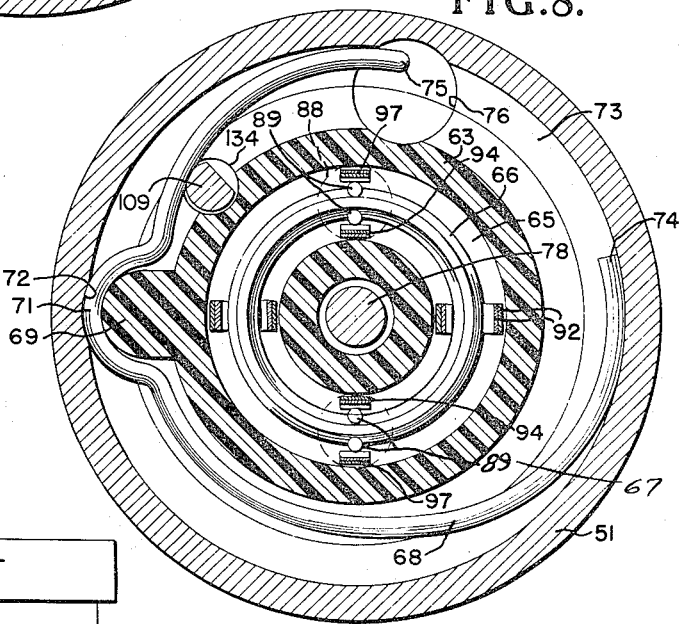
INVENTOR.
T. E. DINSMOOR
BY
ATTYS.

June 5, 1956     T. E. DINSMOOR     2,748,704
ARMING DEVICE FOR TORPEDO EXPLODERS
Filed Nov. 29, 1951     5 Sheets-Sheet 5
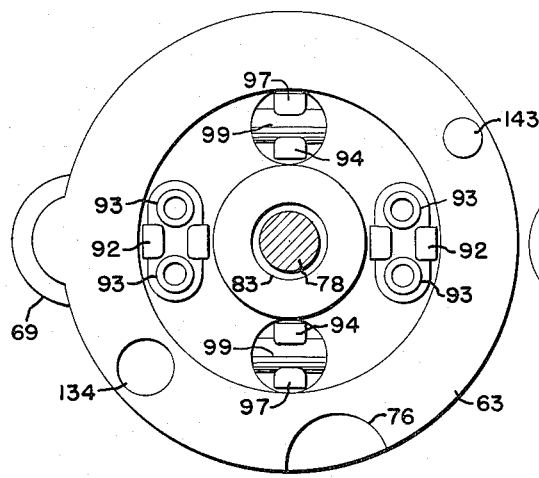
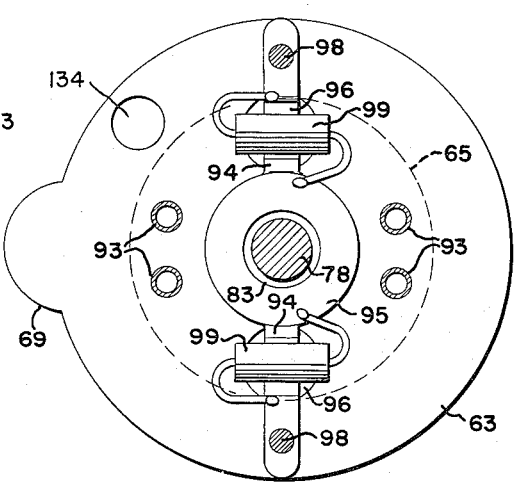
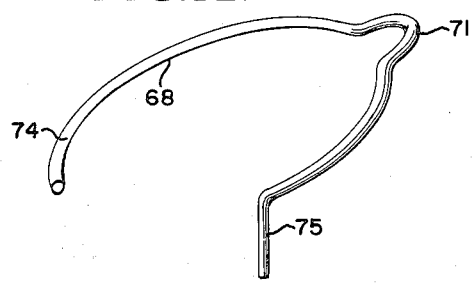
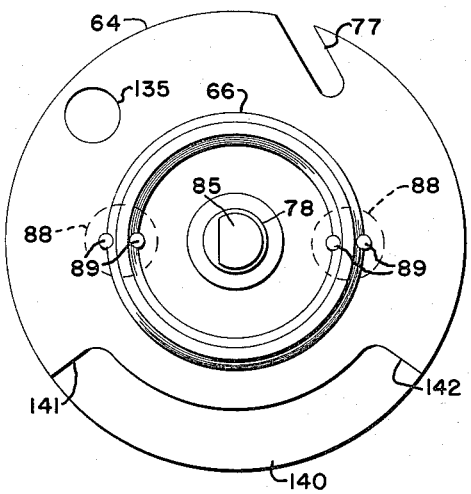
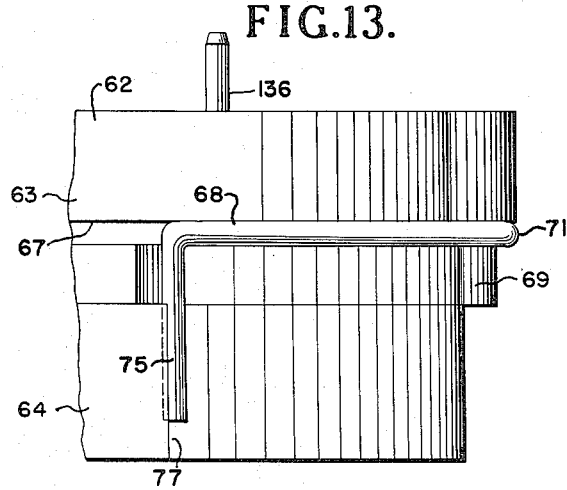
INVENTOR.
T. E. DINSMOOR
ATTYS.

United States Patent Office 2,748,704
Patented June 5, 1956

2,748,704

ARMING DEVICE FOR TORPEDO EXPLODERS

Theodore E. Dinsmoor, Spencerville, Md.

Application November 29, 1951, Serial No. 258,974

7 Claims. (Cl. 102—70.2)

(Granted under Title 35, U. S. Code (1952), sec. 266)

The present invention relates to an exploder for a torpedo and more particularly to an arming switch mechanism for a torpedo exploder having improved qualities of safety and performance.

Prior art exploders having been found to be not entirely satisfactory in service, the arming device of the present invention is provided with improvements which ensure the assembly of the device in a safe position in the exploder and further which ensure the firing of the booster charge under adverse conditions.

More specifically, the device of the present invention is provided with apparatus for preventing accidental assembly of the detonator rotor in the armed position, a spring ring being mounted on the rotor forming a part of the device, prior to assembly of the arming switch in the safety chamber therefor which coacts with grooves and slots in the rotor and safety chamber to prevent improper assembly and to lock the rotor assembly in the safety chamber or housing against removal once it is assembled therein.

The device of the present invention is further provided with an improved firing circuit in which a pair of electro-responsive detonators are arranged, the terminals of each of the detonators being shorted by certain contacts when the arming switch is in the unarmed or safe position. When the arming switch is in the armed position certain other contacts engage the detonator terminals to connect the detonators with the firing circuit of the torpedo, the detonators being in series parallel arrangement with respect to the source of power, each of the detonators having a resistor across the terminals thereof whereby the circuit functions to fire one of the detonators if the other detonator fails to fire.

In the explosive train of the present invention the various elements thereof are sealed against moisture, thus preventing chemical deterioration of the components of the detonators, tetryl lead-ins and booster charge.

An object of the present invention is to provide a new and improved torpedo exploder arming switch having high safety and performance characteristics.

Another object is to provide a torpedo exploder having an improved switch apparatus for preventing to a great extent operational failure.

Still another object is to provide an improved torpedo exploder having the powder train thereof sealed against the ingress of moisture.

A further object is to provide a torpedo exploder having an improved arming switch which is locked against removal and which is capable of being assembled in only the unarmed position thus improving the safety characteristics thereof.

A still further object is to provide an arming switch for a torpedo exploder which combines the qualities of high performance, safety, and reliability with simplicity and ruggedness.

Other objects and many of the attendant advantages of this invention will be readily appreciated as the same becomes better understood by reference to the following detailed description when considered in connection with the accompanying drawings wherein:

Fig. 7 is a sectional view taken along line 7—7 of Fig. 5;

Fig. 8 is a sectional view similar to Fig. 7 and showing the device in the armed position;

Fig. 9 is a bottom plan view of the stationary switch structure and showing the contact members;

Fig. 10 is a sectional view taken along the line 10—10 of Fig. 5;

Fig. 11 is a plan view of the rotor member of the arming apparatus;

Fig. 12 is a perspective view of the locking ring;

Fig. 13 is a fragmentary elevation showing the downturned end of the locking ring in engagement with the notch of the rotor;

Fig. 14 is a fragmentary elevation showing the stop pin for limiting the movement of the rotor; and Fig. 15 is a diagram of the electrical circuit for firing the detonators.

Figure 1:
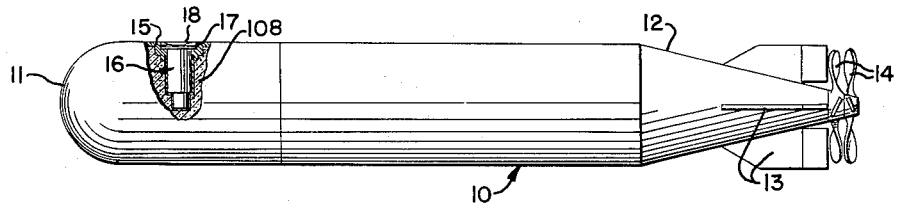
Fig. 1 is a side elevation of a torpedo having parts broken away and showing the exploder containing the apparatus of the present invention mounted therein.
Figure 2:
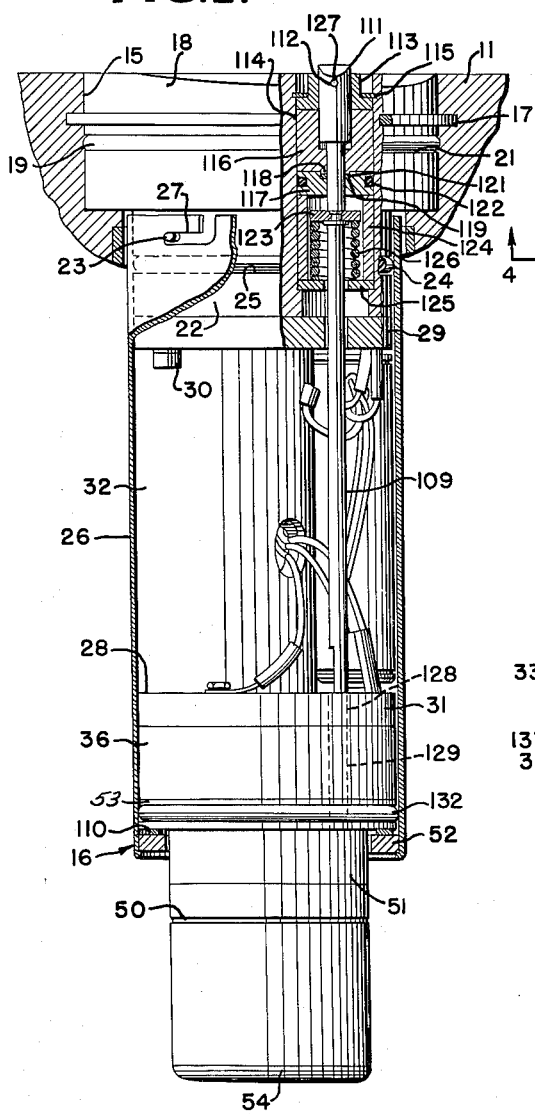
Fig. 2 is an elevation of the exploder containing the apparatus of the present invention and showing parts in section and parts broken away to indicate the arming rod thereof.
Figure 3:
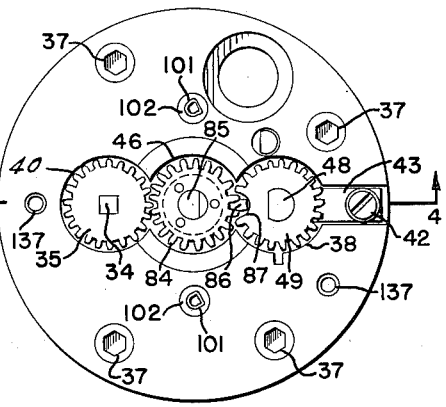
Fig. 3 is a bottom plan view of the drive gears for the arming mechanism.
Figure 4:
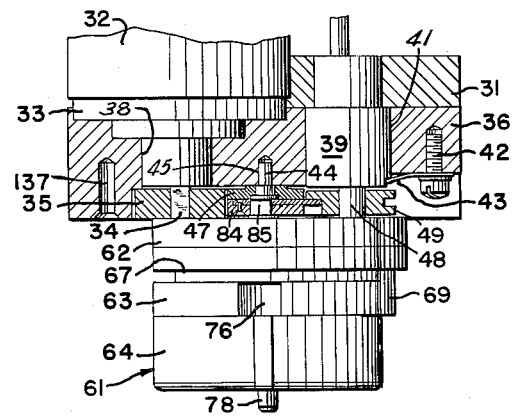
Fig. 4 is a sectional view taken along line 4—4 of Fig. 3.

Referring more particularly to the drawings wherein like numerals indicate like parts throughout the several views; a torpedo is indicated generally at 10 which has a warhead 11, a tapered tail portion 12, rudder and stabilizing mechanism 13, and counter-rotating propellers 14.

Mounted within a handhole 15 in warhead 11 is an exploder mechanism 16 in which the present invention is mounted. The exploder mechanism 16 is retained in the handhole 15 in any well known manner such, for example, as by a spring ring 17 mounted in a groove in head 18 of the exploder and sprung outwardly into a groove in handhole 15. There is, also, provided an O-ring gasket 19 set in groove 21 of head 18, gasket 19 being in leakproof engagement with the wall of handhole 15 to exclude moisture from the handhole and the mechanism contained therein. Head 18 is provided with a reduced extension 22 which has a plurality of radial pins 24 mounted thereon. A second O-ring gasket 24 is mounted in groove 25 in extension 22. Gasket 24 contacts tubular casing 26 having bayonet slots 27 for engagement with pins 23 to retain casing 26 on extension 22. Depending from and having one end thereof secured to extension 22 is a supporting member 28 comprising upper and lower disk members 29 and 31 respectively and a tubular member 32 mounted therebetween, member 29 being secured to extension 22 by bolts 30.

Mounted in tubular member 32 is an electric motor 33 fitted with a reduction gear and having a drive shaft 34 extending therefrom. A gear 35 is rotatively fixed to shaft 34, the shaft being square in cross section. A circular plate 36 is secured to disk 31 by bolts 37. Motor 33, shaft 34 and gear 35 extend into graduated bore 38 of plate 36. A switch member 39 is mounted in bore 41 of plate 36, the purpose of switch 39 will be hereinafter more fully described. Switch 39 is retained in bore 41 by means of screw 42 and retaining member 43.

A pin 44 is pivotally fitted into bore 45 which is axially aligned with bore 46 which communicates at the sides thereof with bores 40 and 38. A gear 47 is secured to pin 44 and meshes with the upper portion of the drive gear 35. Switch 39 has projecting at the lower end thereof a switch operating shaft 48 having a dual gear 49 fixed thereon. The upper portion of gear 49 meshes with the gear 47 thus, as the motor 33 rotates, rotative motion is applied to shaft 48 of switch 39.

A detonator switch housing or safety chamber 51 is mounted in the lower end of tubular casing 26, the casing having a ring member 52 fixed in the lower end thereof to retain the flange 53 of housing 51. The housing 51 extends through the ring 52 and has mounted on the outer end thereof a casing 54 containing a booster charge 55. In order to secure the casing 54 to housing 51, the casing 54 is crimped as at 50 into a circumferential groove 50 formed on housing 51. The housing 51 is formed with a second groove 57 adjacent the periphery of casing 54 for receiving an O-ring gasket 58 to prevent the entrance of moisture into casing 54.

Housing 51 is formed with a recess or bore 59 to receive the arming switch 61 comprising a pair of fixed disk members 62 and 63 and a rotor 64. Members 62 and 63 and rotor 64 are formed of a suitable insulating material. Member 63 has a circular well 65 opening at the lower face thereof, while rotor 64 has a circular flange 66 projecting into well 65 and centered therein.

As shown particularly in Figs. 5 through 8 member 63 is provided with a groove 67 for receiving a locking ring 68, groove 67 being interrupted by a locking key 69 formed on member 63. Ring 68 has a semicircular curved portion 71 which is fitted around the key 69 to prevent rotation of ring 68 with respect to member 63. The key 69 and portion 71 of ring 68 are fitted into a complementary vertical groove 72 in housing 51 thus preventing rotation of member 63 with respect to housing 51. When groove 67 reaches circumferential groove 73 in housing 51 during the insertion of switch 61 in the housing the end 74 of ring 68 snaps into groove 73, preventing removal of the switch assembly 61 after installation thereof in housing 51. The opposite end of ring 68 is provided with a downturned extension 75 which passes through semicircular notch 76 in member 63 and into angular cut 77 in rotor 64, thus the rotor is held in a predetermined position with respect to housing 51 as will be hereinafter more fully described.

In order to further assist in aligning rotor 64 with respect to fixed member 63, the rotor 64 is formed with an opening 140 having shoulders 141 and 142 while member 63 is formed with a pin 143 which rides in opening 140 and engages the shoulders 141 and 142 at the limits of motion thereof thus preventing overriding of the rotor with respect to member 63.

Rotor 64 is fixedly mounted on shaft 78, the shaft being mounted at opposite ends thereof in bushings 79 and 81. Bushing 79 is mounted in bottom wall 82 of housing 51, while bushing 81 is mounted in member 62. Shaft 78 passes through bore 83 in member 63. Gear 84 is fixedly mounted on the reduced end 85 of shaft 78 and meshes with gears 35 and 49. It will thus be seen that motor 33, switch 39, and rotor 64 are interconnected by gears to rotate simultaneously and at the same speed. Gear 84 is provided with an aligning finger 86 which meshes with notch 87 of gear 49 to provide for correlative operation of switch 39 and rotor 64.

Rotor 64 is formed with a pair of diametrically opposed sockets 90 in which are positioned electro-responsive detonators 88. Each detonator 88 is provided with a pair of contact prongs 89 extending in grooves 91 along the inner and outer sides of the flange 66 as shown in Figs. 5, 6, 7, 8 and 11.

Figure 5:
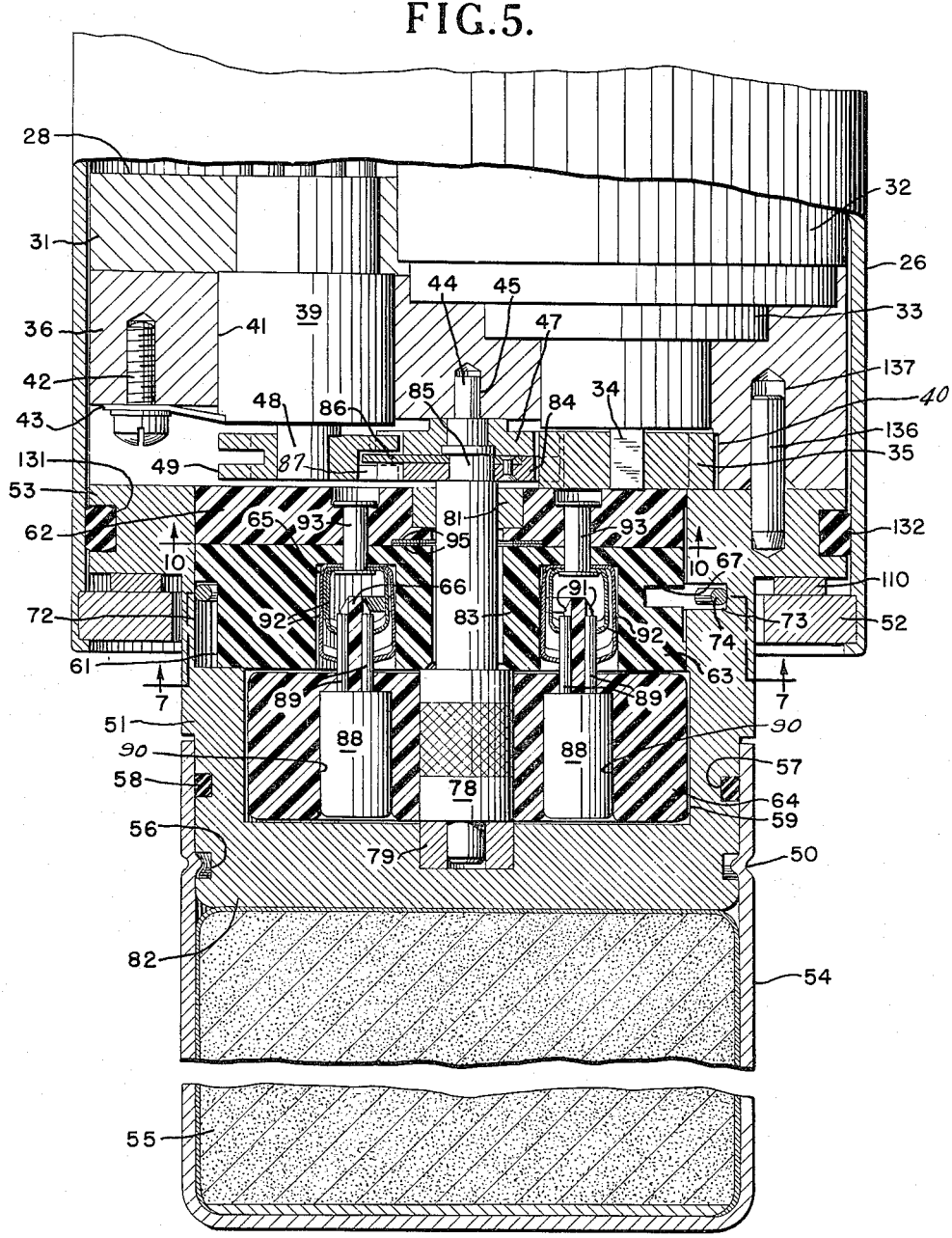
Fig. 5 is a fragmentary vertical sectional view taken through the exploder mechanism at the lower end thereof and showing the arming apparatus in the safe or unarmed position.
Figure 6:
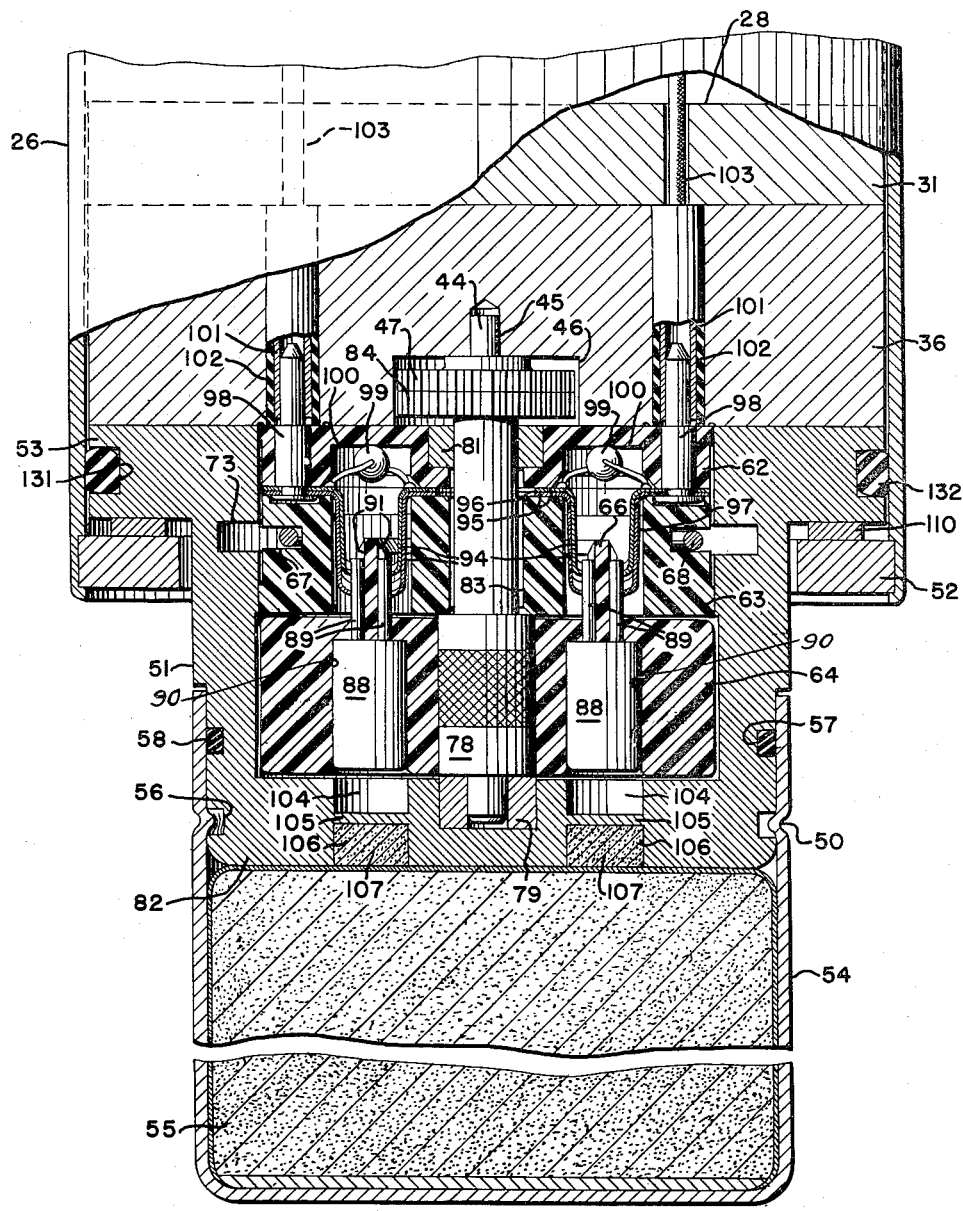
Fig. 6 is a vertical sectional view taken at 90° with respect to Fig. 5 and showing the arming apparatus in the armed position.

Pairs of shorting spring contact members 92 engage each pair of prongs 89 when rotor 64 is in the safe or unarmed position (Fig. 5). Each pair of contact members 92 are secured in well 65 at diametrically opposed points by tubular rivets 93 which also secure member 62 and 63 together. It is obvious that detonators 88 are rendered safe against accidental firing when shorted as indicated in Fig. 5. It is also obvious that rotor 64 can be assembled only with extension 75 of ring 68 in cut 77 thus assuring that the detonators are in the proper rotative position to be shorted.

Pairs of inner arming contacts 94 are formed on disk members 95, the disk members having bores 96 to permit shaft 78 to pass therethrough and having a clearance to prevent contact with the shaft. Pairs of outer arming contacts 97 are secured to member 62 by upsetting the ends of prongs 98. Resistors 99 are mounted in openings 100 in member 62 and are shunted across the contacts 94 and 97. Prongs 98 extend into contact sockets 101 which are mounted in plate 36 and insulated therefrom as at 102. Conductors 103 carry electrical energy from a firing circuit to the contact sockets 101 when the circuit is energized.

When detonators 88 are in the safe position they are located over a solid portion of wall 82 and when in the armed position the detonators 88 are located over recesses 104 in the upper side of wall 82 while positioned directly beneath recesses 104 and separated therefrom by thin metallic walls 105 are recesses 106 containing tetryl lead-ins 107, which, in turns, abut the booster charge 55. It will thus be apparent that upon energization of the detonators by the firing circuit, the detonators will fire into recesses 106 and through walls 105 to ignite tetryl lead-ins 107 which, in turn, fire the booster charge 55, thus firing the main charge 108 of the torpedo warhead 11.

Flange 53 of housing 51 is provided with a groove 131 containing an O-ring gasket 132 to exclude moisture from the mechanism.

There is, also, provided a spring ring 110 interposed between ring 52 and flange 53 to apply tension on casing 26 to lock pins 23 in bayonet slots 27 thus to retain the casing 26 on head 18.

In order to positively lock the arming switch in the safe position after assembly of the exploder, an arming rod 109 is provided. Rod 109 has an enlarged portion 111 having a transverse bore therethrough as at 112. A flanged cap 113 is secured in bore 114 of head 18 by locking ring 115. A sealing gland comprising members 116 and 117 are retained in bore 114 by cap 113, member 116 having a bore to receive portion 111 and an extension 118 nested in recess 119 in member 117 to compress gasket 121 contained therein, thus to prevent entrance of water around 109. Member 117 is also provided with a groove containing an O-ring gasket 122 to seal bore 114 against entrance of water. Washer 123 is fixed to rod 109 and tubular spacer member 124 is mounted in bore 114 between member 117 and disk 125. A spring 126 is interposed between disk 125 and washer 123 and urges the rod 109 outwardly of the head 18. In order to retain the rod 109 in a safe position against the tension of spring 126, an arming wire 127 is run through bore 112 of rod 109 and a pair of bores in flanged cap 113. The lower end of rod 109, when the rod is in the safe position, extends through bore 128 in lower disk 31, bore 129 in circular plate 36, a bore in disk 62 in alignment with bore 129 (not shown), bore 134 in member 63, and into bore 135 of rotor 64, thus locking rotor 64 in the safe position, that is, with the detonators 88 rotated 90° with respect to tetryl lead-ins 107 and with the prongs 89 thereof shorted by contacts 92.

Housing 51 is provided with a pair of centering pins 136 which are fitted into bores 137 in circular plate 36, thus positively positioning housing 51 and the switch mechanism 61 contained therein with respect to plate 36 and the gear drive mounted therein.

In operation, the arming switch mechanism 61 is inserted into housing 51, the key portion 69 fitting into groove 72 to prevent rotation of switch members 62 and 63 with respect to housing 51, the locking ring 68 engaging grooves 67 and 73 to prevent removal of the switch mechanism. Downturned portion 75 of ring 68 engages angular cut 77 of rotor 64 to align detonators 88 in the safe position that is, a 90° rotation from the tetryl lead-ins 107, during the assembly thereof in housing 51, and to align the detonator prongs 89 in engagement with shorting contacts 92.

The housing 51, with arming switch 61 assembled therein is mounted on supporting member 28, pins 136 of housing 51 being inserted in bores 137 of plate 36, and prongs 98 are inserted at the same time into sockets 101. The pins 136 are positioned off-center so that assembly can be made in only one way. It is, also, to be noted that end 85 of shaft 78 is inserted in gear 84 at the same time, the position of shaft 78 being set with respect to shaft 48 thereby to synchronize the movement of switches 61 and 39. As the aforementioned assembly takes place, arming rod 109 extends through bores 128, 129, 134 and 135, thus locking rotor 64 in safe position and engaging spring ring 68 to force extension 75 out of slot 77. When the arming wire 127 is removed prior to launching torpedo 10 the arming rod 109 is urged outwardly by means of spring 126 a distance sufficient to clear the rotor 64 while continuing to engage ring 68 thus retaining extension 75 out of slot 77.

At an appropriate time after launching of the torpedo, motor 33 is energized by closing of a hydrostatic pressure operated switch (not shown) or other suitable means. Motor 33 drives gears 35, 47, 84, and 49 a quarter revolution or 90°, thus rotating switch 39 to the position to open the motor drive circuit and rotating the rotor 64 containing detonators 88 from the safe position to the armed position, the firing circuit of the detonators being closed except for an inertia-operated switch (not shown) which when closed by the warhead 11 striking the target causes energization of the firing circuit and firing of the detonators. The detonators, on firing, generate high temperature and high pressure gas in recesses 104, burning or breaking through walls 105, igniting tetryl lead-ins 107 and setting off booster charge 55 which, in turn, sets off the main charge 108 in the warhead 11 of the torpedo.

As shown in the electrical diagram of Fig. 15 the two detonators 88 are connected in series in the firing circuit of the torpedo 10, each detonator being shunted by a fixed resistor 99. The resistors also shunt the switch contacts 94 and 97. Thus the firing circuit will be effective to fire the main charge in case of a defective detonator where the bridge wire is broken or in case there is another open connection in one of the detonators or in one set of the switch contacts. Under such conditions the current reaches the remaining detonator through the resistor 99 of the defective detonator thus firing the remaining detonator. The firing circuit is equally effective to fire one of the detonators in case of a short in the other detonator or the switch contacts associated therewith.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without payment of any royalties thereon or therefor.

What is claimed and desired to be secured by Letters Patent of the United States is:

1. Arming apparatus for a torpedo exploder comprising, in combination, a hollow cylindrical casing having an open end and a closed end, said casing having a vertical groove and a circumferential groove formed in the inner cylindrical wall thereof, a fixed switch member having a circumferential groove and a vertical key portion, said switch member fitting snugly into the cylindrical casing, said key portion fitting into said vertical groove to prevent rotation of said switch member, a rotor mounted in said cylindrical casing between said fixed member and the closed end of said casing, said rotor having a vertical notch in the periphery thereof, and a spring locking ring mounted in the circumferential groove in said switch member and having one end thereof extending into said circumferential groove in the casing to prevent removal of said member from the casing, the other end of said ring having a downturned extension projecting into said notch in the rotor to permit assembly of the rotor in only one position with respect to the fixed member, said spring ring having a curved portion fitting between said vertical groove and the vertical key portion to prevent rotation of said spring ring.

2. Apparatus for arming a torpedo exploder comprising, in combination, a housing for said apparatus, a fixed insulating member mounted in said housing, a rotatable insulating member mounted in face adjacency with said fixed insulating member, first pairs of contacts mounted on said fixed member in diametrically opposed relation thereon, second pairs of contacts mounted on said fixed member in diametrically opposed relation and spaced 90° from said first pairs of contacts, said housing having a thick bottom wall provided with a pair of inner diametrically opposed recesses and a pair of outer recesses aligned with said inner recesses and separated therefrom by thin partitions, a pair of electro-responsive detonators mounted in diametrically opposed relation in said rotatable insulating member and having contact prongs projecting therefrom, said prongs being adapted to engage said first pairs of contacts when in a safe position and to engage said second pairs of contacts when the rotatable member is rotated 90° to the armed position, said first contacts shorting each of said detonators when the rotatable member is in the safe position, said second contacts connecting the detonators in a firing circuit therefor when the rotatable member is in the armed position, a wire locking ring mounted in a groove in said fixed member and having a depending finger engaging a slot in the periphery of the rotatable member for retaining the rotatable member in the safe position, and an arming rod engaging said locking ring to move said finger out of said slot and for locking said rotatable member in the safe position after the release thereof by the locking ring.

3. Arming apparatus for a marine ordnance device comprising, in combination, diametrically opposed pairs of first shorting contacts, diametrically opposed pairs of second circuit closing contacts, a structure of insulating material having a circumferential groove therein and having a circular groove in a plane face thereof, said first and second contacts being fixedly mounted in said circular groove, said second contacts being positioned 90° around said groove with respect to said first contacts, a rotor of insulating material having a projecting ring formed thereon and adapted to rotate in said groove as the rotor is moved, a pair of electro-responsive detonators mounted in diametrically opposed bores in said rotor, each of said detonators having prongs extending on the inner and outer sides of said ring and adapted to engage said first contacts in a safe position of said rotor and to engage the second contacts when moved to an armed position thereof, a locking bore formed in said rotor, a bore formed in said structure and aligned with said locking bore when the rotor is in the safe position, a spring-urged rod normally held against movement by an arming wire and extending through said locking bore and the bore in said structure to retain the rotor in the safe position with respect to said structure and spring-urged when released by said wire to release the rotor, a spring ring mounted against rotation in said circumferential groove and having a downturned extension at one end thereof for engaging a notch in said rotor whereby the detonators and prongs therefor are engaged by said shorting contacts during the assembly of said rotor with said structure, said rod engaging said spring ring to withdraw the downturned extension thereof from said notch whereby the rotor is held by said rod, driving means for said rotor whereby the rotor is moved from the safe position to the armed position thereof after release thereof by the rod, and a limit switch operatively connected to said driving means for deenergizing said driving means as the rotor reaches the armed position.

4. Arming and firing apparatus for a torpedo exploder comprising, in combination, a tubular casing having an open end and a closed end of sufficient thickness to resist the explosive force of a pair of detonators, said closed end having a pair of diametrically opposed first recesses formed therein and opening on the inside of said casing, a pair of second recesses formed in said closed end and opening on the outside of said casing in axial alignment with said first recesses, said first and second recesses being separated by thin walls capable of being burned or ruptured by the gases generated by the firing of said detonators, tetryl lead-ins mounted in said second pair of recesses, a cased booster charge secured to said casing, one end of said booster charge being in face adjacency with said tetryl lead-ins, a rotor mounted in said casing and in face adjacency with said first recesses, said rotor having a pair of diametrically opposed bores, a pair of electro-responsive detonators mounted in said bores, each of said detonators having a pair of contact prongs extending therefrom, a ring extending from said rotor and having said contact prongs extending along the inner and outer sides thereof, a shaft fixed to said rotor and mounted axially therein, a fixed member mounted in said casing and having a groove formed in one face thereof to receive for rotation therein said ring and contact prongs, a pair of shorting contact assemblies mounted at diametrically opposed positions in said groove, a pair of circuit closing contact assemblies mounted in said groove at diametrically opposed positions in said groove and at 90° with respect to said shorting contacts, said shaft passing through and extending beyond a bore formed axially in said fixed member, said shaft being flattened on one side of the extended end thereof, a gear mounted on said shaft and having a bore with a flattened side to fit said shaft extension whereby said shaft is fixed for rotation with said gear, an electric motor having an energizing circuit therefor and having a shaft and a gear thereon, said motor gear meshing with said first-named gear, said first-named gear having a finger extending therefrom, a rotating switch member for opening said energizing circuit, and a gear for driving said switch member and meshing with said first-named gear, said switch gear having a notch to receive said finger whereby said switch rotation is synchronized with said rotor.

5. Switching mechanism for a torpedo exploder comprising, in combination, a rotating member, a pair of electro-responsive detonators mounted at diametrically opposed positions in said rotating member, each of said detonators having a pair of extending contact prongs, a fixed member, diametrically opposed shorting contact assemblies mounted in said fixed member, diametrically opposed circuit making contact assemblies mounted in said fixed member at 90° with respect to said shorting contacts, said rotating and said fixed members being in face adjacency, means for rotating said rotating member from a position wherein said shorting contacts engage said prongs to a position wherein said circuit making contacts engage said prongs thereby arming the detonators, a resistor mounted across each assembly of said circuit making contacts whereby one of said detonators is energized when an open circuit condition exists in the other of said detonators.

6. Switching mechanism for a torpedo exploder comprising, in combination, a rotating member, a pair of electro-responsive detonators mounted at diametrically opposed positions in said rotating member, each of said detonators having a pair of extending contact prongs, a fixed member, diametrically opposed shorting contact assemblies mounted in said fixed member, diametrically opposed circuit making contact assemblies mounted in said fixed member at 90° with respect to said shorting contacts, said rotating and said fixed members being in face adjacency, electric driving means connected to said rotating member, said electric driving means moving said rotating member from a safe position wherein the detonator prongs are engaged by the shorting contacts to an armed position wherein the detonator prongs are engaged by the circuit closing contacts, and a switch driven by said driving means and in synchronism with said rotating member for opening the circuit of said electric driving means whereby the rotating member is stopped as the armed position thereof is reached.

7. An arming switch mechanism for a torpedo exploder comprising, in combination, a hollow cylindrical casing having a closed end and an open end, an insulating supporting member fixedly supported in said casing, shorting contact members mounted on said supporting member, circuit closing members mounted on said supporting member and spaced 90° from said shorting contact members, a rotor mounted for rotation within said casing and in face adjacency to said supporting member, electro-responsive detonators mounted in said rotor and having contact prongs extending therefrom, said detonator prongs engaging the shorting contacts when said rotor is in the safe position and engaging the circuit closing contacts when in the armed position, said circuit closing contacts being connected in the detonator firing circuit of the torpedo, electric motor driven means for moving the rotor from the safe position to the armed position thereof, switch means driven by said motor means for stopping the motor means when the rotor is in the armed position, tetryl lead-ins set in said casing in the closed end thereof, said tetryl lead-ins being in axial alignment with said circuit closing contacts whereby the lead-ins are in alignment with the detonators when the detonators are in the armed position thereof, and a cased booster charge mounted adjacent said lead-ins for firing thereby when the detonators are fixed by said firing circuit.

References Cited in the file of this patent

UNITED STATES PATENTS

| 2,468,120 | Senn | Apr. 26, 1949 |
| 2,511,872 | Parker | June 20, 1950 |

FOREIGN PATENTS

| 1,089 | Great Britain | of 1912 |
| 91,592 | Sweden | Feb. 24, 1938 |